United States Patent
Sevindik

(10) Patent No.: US 11,622,262 B2
(45) Date of Patent: Apr. 4, 2023

(54) RADIO ACCESS NETWORK FUNCTION REPOSITORY

(71) Applicant: CHARTER COMMUNICATIONS OPERATING, LLC, St. Louis, MO (US)

(72) Inventor: Volkan Sevindik, Parker, CO (US)

(73) Assignee: CHARTER COMMUNICATIONS OPERATING, LLC., St. Louis, MO (US)

( * ) Notice: Subject to any disclaimer, the term of this patent is extended or adjusted under 35 U.S.C. 154(b) by 21 days.

(21) Appl. No.: 17/334,041

(22) Filed: May 28, 2021

(65) Prior Publication Data

US 2022/0386106 A1    Dec. 1, 2022

(51) Int. Cl.
| | |
|---|---|
| H04W 4/00 | (2018.01) |
| H04W 8/24 | (2009.01) |
| H04W 24/02 | (2009.01) |
| H04W 76/11 | (2018.01) |
| H04W 8/28 | (2009.01) |

(52) U.S. Cl.
CPC ............... *H04W 8/24* (2013.01); *H04W 8/28* (2013.01); *H04W 24/02* (2013.01); *H04W 76/11* (2018.02)

(58) Field of Classification Search
None
See application file for complete search history.

(56) References Cited

U.S. PATENT DOCUMENTS

| | | | | |
|---|---|---|---|---|
| 8,751,613 | B1 * | 6/2014 | Medved | H04L 47/10 370/229 |
| 2020/0028920 | A1 | 1/2020 | Livanos et al. | |
| 2020/0034165 | A1 | 1/2020 | Chou et al. | |
| 2021/0377827 | A1 * | 12/2021 | Yao | H04W 24/02 |

FOREIGN PATENT DOCUMENTS

| | | |
|---|---|---|
| GB | 2558585 A | 7/2018 |
| WO | 2020034639 A1 | 2/2020 |

* cited by examiner

*Primary Examiner* — Suhail Khan
(74) *Attorney, Agent, or Firm* — Meagher Emanuel Laks Goldberg & Liao, LLP

(57) ABSTRACT

Various embodiments comprise systems, methods, and apparatus for a radio access network (RAN) Network Repository Function (RNRF) configured to receive gNB feature/capability information from gNB formed by network RAN, store the received gNB feature/capability information, and provide gNB feature/capability information to requesting core network nodes or functions so that these nodes/functions may adapt/configure their operation or the services they provide in response to the gNB capabilities.

33 Claims, 2 Drawing Sheets

RADIO ACCESS NETWORK FUNCTION REPOSITORY

FIELD OF THE DISCLOSURE

The present disclosure generally relates to wireless communications systems and related networks, and more particularly to mechanisms for

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fifth generation (5G) wireless access technology, known as New Radio (NR) as described/developed by the Third Generation Partnership Project (3GPP), is a Service-Based Architecture (SBA) where network functions based in the Control Plane are interconnected via a service message interface bus for exposing the 5G network capabilities within the Core Network.

These network functions include a network function repository function (NFR) that maintains the list of available Network Functions instances and their profiles, in addition to service registration and discovery capabilities so that different network functions can find each other, and an Access and Mobility Management Function (AMF) that performs various Mobility Management, Registration Management, Connection Management, and other functions. When a node1 in the core network needs a serviceA, the node1 queries the NRF to learn which node provides this service in the core network, the NFR identifies the node providing this service (e.g., node2) and sends this information to node1, and node1 connects with node2 to receive this service.

SUMMARY

Various deficiencies in the prior art are addressed by systems, methods, and apparatus for a radio access network (RAN) Network Repository Function (RNRF) configured to receive gNB feature/capability information from gNB formed by network RAN, store the received gNB feature/capability information, and provide gNB feature/capability information to requesting core network nodes or functions so that these nodes/functions may adapt/configure their operation or the services they provide in response to the gNB capabilities.

A method according to an embodiment comprises: at a radio access network (RAN) Network Repository Function (RNRF) in a network core having an IP address known to gNB being provisioned at one or more RAN associated with the network core, receiving capability information from each gNB being provisioned, associating received gNB capability information with a respective gNB identifier, and storing the received gNB capability information and associated identifier in a database; and at the RNRF, in response to receiving from a network function (NF) a request for capability information of an identified gNB, using the gNB identifier to retrieve the requested gNB capability information from the database and forward the retrieved gNB capability information to the requesting NF, the gNB capability information being configured to enable the NF to adapt a network function.

Network equipment according to an embodiment may by used to implement network functions at a network core, the network equipment comprising processing resources and non-transitory memory resources, the processing resources configured to execute software instructions stored in the non-transitory memory resources to provide thereby a core network function, comprising: a radio access network (RAN) Network Repository Function (RNRF) having an IP address known to gNB being provisioned at one or more RAN associated with the network core; the RNRF receiving capability information from each gNB being provisioned, associating received gNB capability information with a respective gNB identifier, and storing the received gNB capability information and associated identifier in a database; the RNRF, in response to receiving from a network function (NF) a request for capability information of an identified gNB, using the gNB identifier to retrieve the requested gNB capability information from the database and forward the retrieved gNB capability information to the requesting NF, the gNB capability information being configured to enable the NF to adapt a network function.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
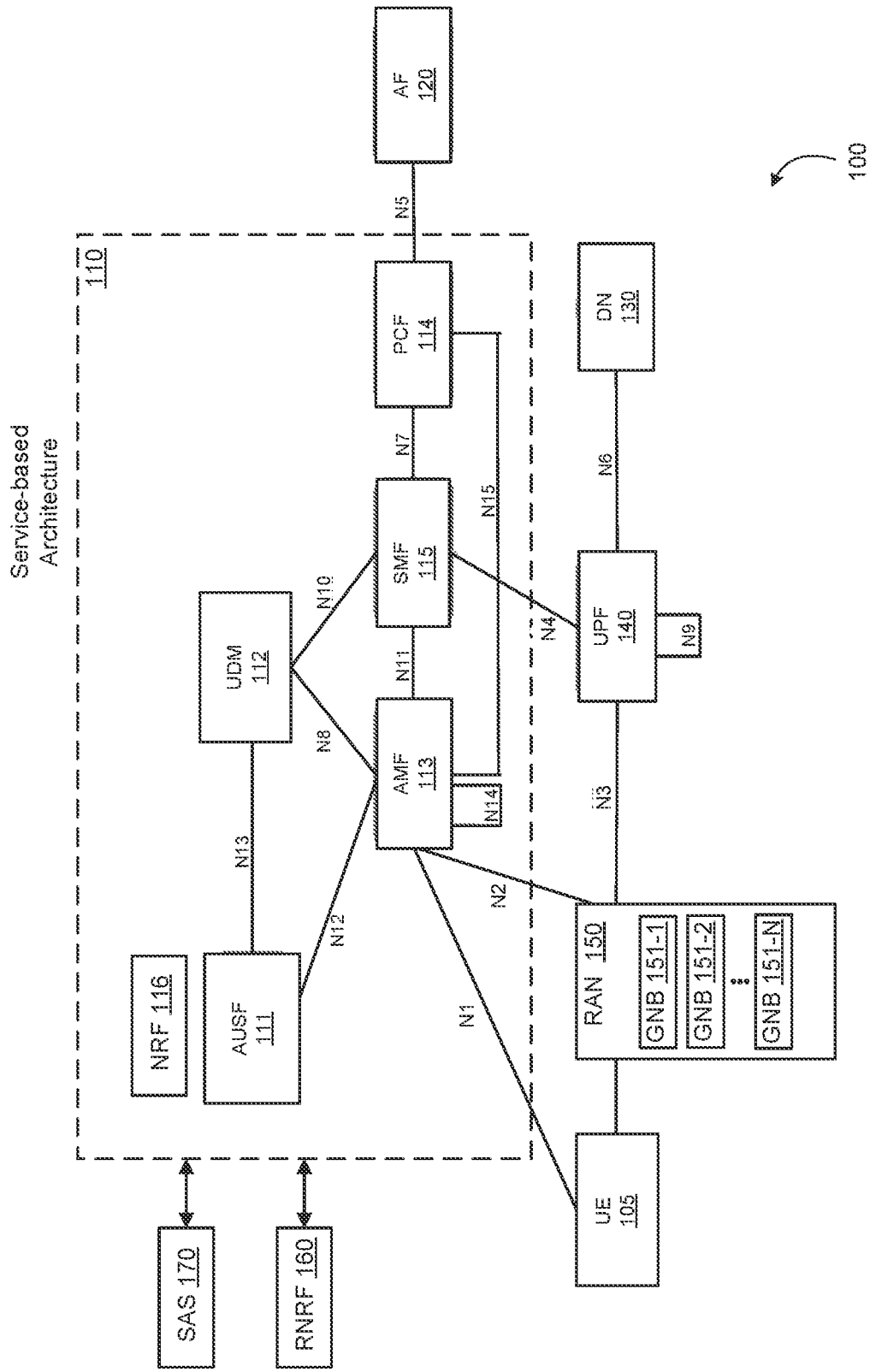
FIG. 1 depicts a service-based architectural representation of a 5G mobile network providing application services to user equipment (UE) in accordance with various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments are directed to methods, apparatus, systems and the like wherein 5G core network nodes provide services to the (non-core) gNBs depending on the services that the gNBs are capable of receiving/delivering, wherein the specific features/capability of gNB are aggregated at a newly defined core network node or network function denoted herein as a RAN Network Repository Function (RNRF) so that other core network nodes or functions may utilize this information to responsively adapt or configure their operation (e.g., Authentication Server Function (AUSF), Unified Data Management (UDM), Access and Mobility Management Function (AMF), Policy Control Function (PCF), Service Management Function (SMF) and so on).

The RNRF is implemented within a 5G core as a stand-alone network node or NF, or as part of an existing network node or NF. Various embodiments contemplate that the RNRF is implemented as a virtualized network node or NF within another virtualized network node or NF, such as within an Access and Mobility Management Function (AMF) or one of the other virtualized network nodes or NFs discussed herein.

FIG. 1 is an illustrative representation of an arrangement of network node functions and other functions suitable for use in a 5G mobile network in accordance with various embodiments.

As depicted in FIG. 1, a service-based architectural representation 110 of a 5G network is depicted as comprising a number of core network functions (NFs) such as described in relevant standards documents such as the 3GPP standards for 5G (e.g. 3GPP 23.501 and 23.502). The network architecture for the 5G mobile network may include a number of core NFs, such as an authentication server function (AUSF) 111, a unified data management (UDM) 112 (having a unified data repository or UDR), an AMF 113, a policy control function (PCF) 114, and a service management function (SMF) 115. A plurality of interfaces or reference points N1 through N15 shown in FIG. 1 may define the communications and/or protocols between each of the entities, as described in the relevant (evolving) standards documents. One or more application functions, such as an application function (AF) 120, may connect to the 5G mobile network via PCF 114. One or more data networks (DN) 130 having application servers (AS) may be connected to the 5G mobile network through UPFs such as UPF 140.

Various UE 105 may obtain access to the 5G network via gNB formed as logical nodes or groupings of resources at a radio access network (R)AN or RAN 150, depicted as gNB 151-1 through 151-N (collectively gNB 151).

The UE 105 may comprise any suitable type of device, such as cellular phones, smart phones, tablet devices, Internet of Things (IoT) devices, machine-to-machine (M2M) communication devices, and so on. The number of UE 105 is only limited by the features/capabilities of the many and sometimes differently configured gNB instances within each of many deployed RAN 150.

The RAN 150 may comprise resources using licensed spectrum, unlicensed spectrum such as citizens broadband radio service (CBRS) spectrum, or a combination of licensed and unlicensed spectrum. The RAN 150 may, in various embodiments, include mid-band (e.g., 3.5 GHz) gNBs, low-band (e.g., under 1 GHz) gNBs, or a combination of mid-band and low-band gNBs. In the case of RAN 150 having Citizens Broadband Radio Service Device (CBSD) capability, allocations of CBRS spectrum are provided via a Spectrum Access System (SAS) 170. Generally speaking, the SAS 170 communicates with the 5G core 110 and is configured to control access to the CBRS frequency band for RANs 150, gNB 151, UE 105 and other CBSD devices. Generally speaking, the SAS 170 is configured to ensure that the CBRS frequency band is allocated for CBSD use, and that such use is adapted government requirements, network congestion, network interference and the like.

The various gNB 151 formed at the RAN 150 may be configured with more or fewer resources of the RAN 150 so at to have features and/or capabilities selected in response to the type and number of UE connected to the RAN 150, the type of services being provided thereby, and so on.

The features/capabilities of gNB may be expressed as, illustratively, a number of antennae allocated to a gNB, a gNB deployment type (e.g., strand-based, attached-based, indoor-small business, fixed wireless access, etc.), a backhaul type, a maximum supported user capacity, hardware capability information, software capability information, and/or other information suitable for use in describing gNB supported features and/or capabilities. Further, there are numerous traffic types and device types served by gNB, and each traffic type and/or device type has associated with it various and sometimes differing sets of service requirements such as down link (DL) data speed (DL throughput), up link (UL) data speed (UL throughput), DL data transmission latency, UL data transmission latency, and so on.

UPF 140 is part of the user plane and all other NFs (e.g., AMF 112, SMF 115, PCF 114, AUSF 111, and UDM 112) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling.

The service-based architecture 110 of the 5G mobile network of FIG. 1 also includes a NF repository function (NRF) 116 communicably coupled to other network node functions within the architecture 110 via a service-based interface Nnrf. The service-based architecture 110 of the 5G mobile network of FIG. 1 may also include various other network node functions (not shown for simplicity), such as a network exposure function (NEF), an unstructured data storage function (UDSF) and so on, along with their relevant interfaces.

The service-based architecture 110 of the 5G mobile network of FIG. 1 is improved with the addition (or use) of a RAN Network Repository Function (RNRF) 160 communicably coupled to network node functions within the architecture 110 via a service-based interface Nrnrf. The RNRF 160 is configured to receive gNB feature/capability information, maintain a database of received gNB feature/capability information, and responsively provide requested or relevant portions of the gNB feature/capability information to requesting core network nodes or NFs, and (optionally) non-core functions such as various network management and/or network optimization entities.

Advantageously, the RNRF 160 is a repository of gNB feature/capability information configured to enable 5G core network nodes and NFs to provide respective functions/services to the (non-core) gNBs depending on the functions/services that the gNBs are capable of receiving/delivering, wherein aggregated features/capabilities of gNB are located in a database at or proximate the 5G core to facilitate rapid dissemination of features/capability information to core network nodes and NFs.

In accordance with the various embodiments, deployed gNB are provisioned in a normal manner and further provided with a link (e.g., an IP address) associated with a RNRF. The link may be provided as a default or built-in RNRF address associated with an operator network, or a link provided as part of or after the provisioning process. During or after provisioning, each gNB uses the link to transmit toward the RNRF a list of the supported features and/or capabilities of the gNB, such as described above.

The RNRF receives the gNB-transmitted feature/capability lists, associates each received list with the transmitting gNB by assigning a unique identifier, using the IP address of the gNB, and/or using a hard or soft coded identifier from the gNB (serial number, model number, etc.), and stores the associated lists in a local or remote database.

Thereafter, for a gNB connecting to any core network node or function (e.g., Access and Mobility Function (AMF), User Plane Function (UPF), Unified Data Management (UDM) etc.), the core network node or function may query the RNRF using the connecting gNB identifier or IP address to learn the features/capability information of the connecting gNB. This process is repeated for each core network node or function such that a gNB connecting thereto causes the core network node or function to access the RNRF to learn the feature/capability information of the connecting gNB. In this manner, any of the core network or related nodes or NFs (e.g., SMF, UPF, UDM, AuSF, AMF, PCF etc.) may query the RNRF at any time to retrieve features/capability information regarding specific gNB and use the retrieved information to adapt/configure its operation/function with respect to that gNB.

Feature/capability information of a connecting gNB may be used by any core network node or NF to responsively adapt/configure its operation/function so as to impact the quality of service (QoS) delivered to the gNB, such as by adapting/shaping/grooming gNB traffic, adapting the size of traffic buffers or other storage or memory allocations, adapting allocations of virtual compute or memory resources, expediting or not expediting gNB requests and so on.

In various embodiments, based on retrieved gNB feature/capability information, a User Plane Function (UPF) may responsively dedicate larger buffers for gNB with high down link (DL) throughput than for gNB with low DL throughput.

In various embodiments, based on retrieved gNB feature/capability information, an AMF, for example, may adapt network operations for gNB depending upon the type of gNB (e.g., high or low latency gNB, high or low downlink throughput or uplink throughput gNB, and so on). In various embodiments, based on retrieved gNB feature/capability information, the AMF or other core NF treats gNB requests from low latency gNB as expedited or with higher priority than gNB requests from high latency gNB. Other core network nodes or functions, such SMF, UPF, UDM, AuSF, and the like may also query the RNRF at any time to retrieve therefrom capability information regarding a specific gNB and responsively adapt/configure their operation, such as during request servicing operations and the like. For instance, the UDM node that stores the specific accounting, and authorization information regarding user equipment, upon retrieving from the RNRF gNB capability information indicative of a gNB having a capability of serving a very large number of user equipment may responsively reserve additional storage space and/or other resources for that gNB.

In various embodiments, based on retrieved gNB feature/capability information, a UDM, which stores the specific accounting, and authorization information regarding user equipment, may responsively reserve larger amounts of storage space for gNB capable of serving a very high number of user equipment.

These and other various embodiments provide methods and apparatus for aggregating, storing, and providing feature/capability information of active gNB instances to core network nodes or NFs within a network core such as a 5G mobile network core (or non-core nodes/function) to facilitate communications and services delivery to user equipment (UE) attached thereto. The various types of core NF instances may include, for example, an access and mobility management function (AMF), a session management function (SMF), and a policy control function (PCF).

Generally speaking, any node/function in the core network will adjust its own internal resources to adjust the capability of each gNB in downlink and in uplink in terms of data speed, latency, traffic type, types of user equipment served by a gNB and/or other criteria or operating characteristics. As an example, if a gNB serves mobile phones only then the core network nodes may adjust their own resources to serve the mobile phones, whereas if a gNB serves sensors mostly then core network nodes dealing with signaling may dedicated more resources to this gNB. As another example, if a gNB has 16 and more antennas then the PCF may dedicate more internal resources to that gNB in order to increase the DL data speed, and vice versa.

Various elements or portions thereof depicted in FIG. 1 and having functions described herein are implemented at least in part as computing devices having communications capabilities, including for example the UE 105, RAN 150, gNB 151, SAS 170, RNRF 160, core network nodes 110, and so on. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using network equipment used to implement network functions at a network core, network equipment comprising processing resources (e.g., one or more servers, processors and/or virtualized processing elements or compute resources) and non-transitory memory resources (e.g., one or more storage devices, memories and/or virtualized memory elements or storage resources). These processing and memory resources (e.g., compute and memory resources configured to form a 5G core) may be configured to stored and execute software instructions to provide thereby a radio access network (RAN) Network Repository Function (RNRF) as described herein. The network equipment may also be used to provide some or all of the various other core network nodes or functions described herein. That is, these processing resources may also be configured to execute software instructions stored in the non-transitory memory resources to provide thereby other network functions (NFs) as described herein.

The various NFs may interact with each other and with the RNRF, such as retrieving from the RNRF gNB capability information associated with a current or expected NF service request associated with gNB.

Specifically, capability information received and stored via the RNRF may be retrieved by a NF in response to the NF receiving a NF request associated with the gNB that requires servicing by the NF, wherein the RNRF provides the capability information associated with the gNB to the requesting NF, and the NF used the gNB capability information to adapt its servicing of the received NF request associated with the gNB (e.g., allocating more or less or different than a default level of bandwidth, buffer, priority, and/or other resources to or for the gNB, causing other NF to adapt their operations or behavior in response to RNRF-stored gNB capability information, causing other NF management functions/entities to adapt their operations or behavior in response to RNRF-stored gNB capabilities, and so on.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
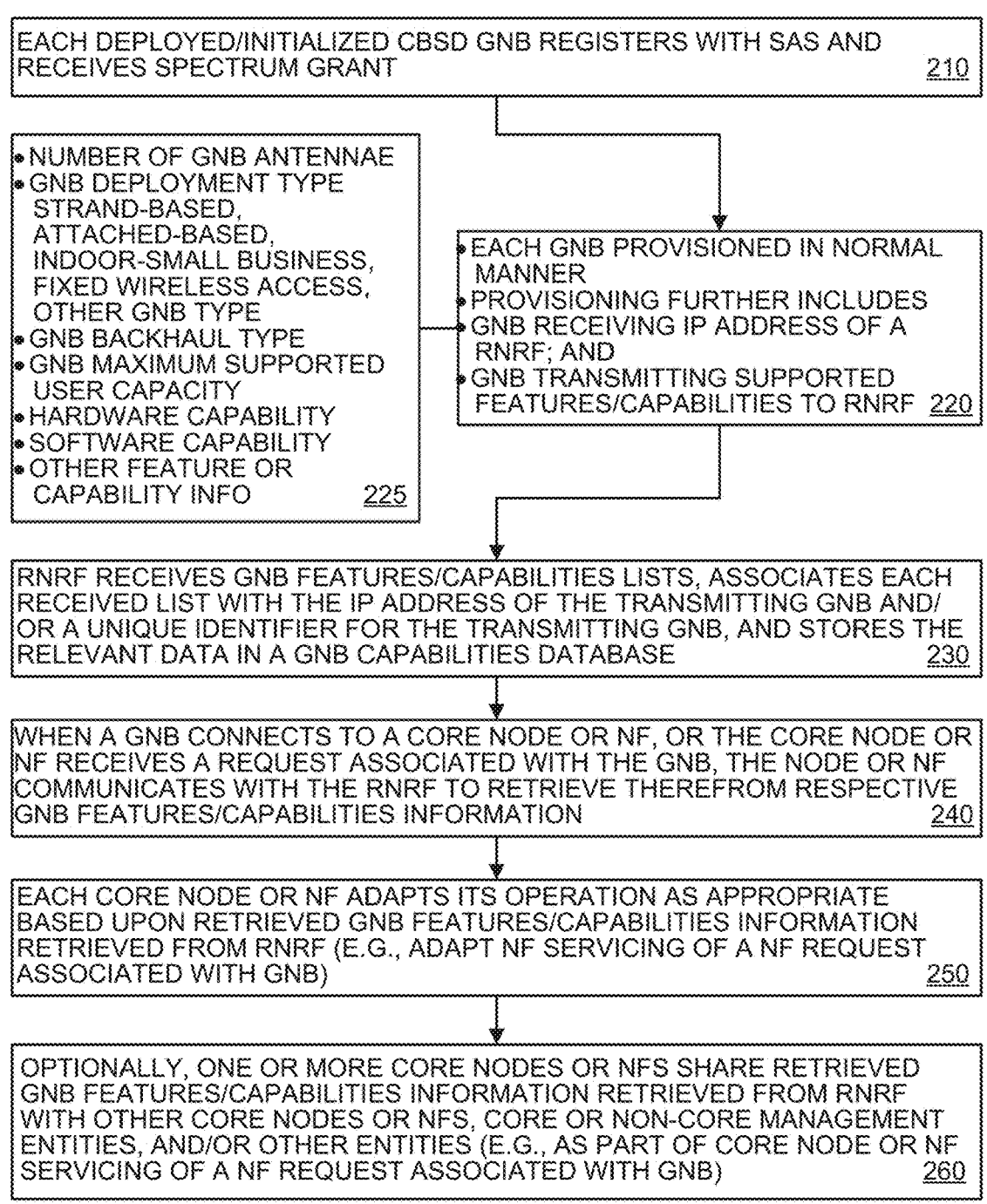
FIG. 2 depicts a flow diagram of a method according to an embodiment.

FIG. 2 depicts a flow diagram of a method according to an embodiment. Specifically, FIG. 2 depicts a flow diagram of a method by which a RAN Network Repository Function (RNRF) is provided to receive, for each of a plurality of active gNB instances, respective gNB feature/capability information, and to store the information in memory (e.g. a database) for subsequent use by other core or non-core network nodes/network functions.

The embodiments of FIG. 2 enable rapid use of gNB RAN feature/capability information of active gNB instances at core network functions (NFs) within a 5G mobile network to facilitate communications and services delivery to user equipment (UE) attached thereto.

At step 210, as each gNB is deployed, initialized, powered-on etc., those that are CBSD gNBs register with an SAS a receive spectrum grants.

At step 220, each gNB is provisioned in a normal manner, wherein the provisioning further includes providing the gNB with a link (e.g., an IP address) associated with a RAN Network Repository Function (RNRF). The link may be provided as a default or built-in RNRF link/address associated with an operator network, or a link/address transmitted to the gNB during the provisioning process. In addition, each gNB transmits toward the RNRF via the link a list of the supported features and/or capabilities of the gNB. Referring to box 225, such features/capabilities may comprise, illustratively, a number of gNB antennae, a gNB deployment type (e.g., strand-based, attached-based, indoor-small business, fixed wireless access, etc.), a backhaul type, a maximum supported user capacity, hardware capability information, software capability information, and/or other information suitable for use in describing gNB supported features and/or capabilities. Further, there are numerous traffic types and device types served by gNB, and each traffic type and/or device type has associated with it various and sometimes differing sets of service requirements such as down link (DL) data speed (DL throughput), up link (UL) data speed (UL throughput), DL data transmission latency, UL data transmission latency, and so on.

At step 230, as gNB are provisioned and then transmitting supported features and/or capabilities lists to the RNRF, the RNRF operates to receive the gNB features and/or capabilities lists from each gNB, associate each received list with the IP address of the transmitting gNB and/or a unique identifier for the transmitting gNB, and store the relevant data in a gNB capabilities database.

At step 240, when a gNB connects to a core node or network function (NF), the core node or NF communicatees with the RNRF to retrieve therefrom the features/capabilities information of the respective gNB. This process is repeated for each core network node or NF. That is, each core network node or NF queries RNRF in the same way to learn about the features/capabilities of each gNB as needed, so as to provide and/or optimize the core services rendered on behalf of the gNB. If a core node or NF has received a request pertaining to the gNB such as directly from a gNB, or from another core node or NF or management entity also servicing the gNB in some manner, the core node or NF will update itself in terms of the capability of the gNB.

At step 250, each core node or NF having retrieved features/capabilities information associated with a gNB, adapts its operation as appropriate for that gNB based upon the corresponding retrieved features/capabilities information retrieved from the RNRF. That is, for a requesting NF servicing a respective received NF request associated with the identified gNB, the gNB capability information provided to the NF by the RNRF is configured to adapt the servicing by the NF of the respective received NF request associated with the identified gNB.

In this manner, the core node or NF may adapt its servicing of a gNB related request so as to improve network efficiency, user experience, SLA compliance, gNB performance, subscriber or service provider priorities, and so on in view of the capabilities of the gNB (i.e., more than just a generic servicing of a gNB by the core node or NF).

At optional step 260, each core node or NF shares the received gNB capability information provided to the NF by the RNRF with other NFs, management entities/resources, and/or other provider equipment (PE) or third party resources used by the NF such as within the context of the NF servicing of the respective received NF request associated with the identified gNB. That is, at optional step 260 a requesting NF servicing a respective NF request associated with the identified gNB may be configured to share the gNB capability information provided by the RNRF with other NFs, non-NFs, and/or other entities/systems if useful to the NF request servicing function and not violative of any provider policies.

In this manner, other core nodes or NFs may be efficiently informed of gNB capabilities so that they may also adapt their servicing of a gNB related request so as to improve network efficiency, user experience, SLA compliance, gNB performance, subscriber or service provider priorities, and so on in view of the capabilities of the gNB (i.e., more than just a generic servicing of a gNB by the core node or NF).

Generally speaking, the various embodiments contemplate that feature/capability information associated with gNBs may be used to adapt and/or configure core network functions in a manner benefiting from such information.

For example, at steps 240-250, when a gNB communicates with the Access and Mobility Function (AMF) of the core network, the AMF queries the NRF to learn the features/capability information of the respective gNB and adapts the operation of the network in response to this features/capability information. For example, if the gNB is a low latency gNB, then the core network may be configured to process requests of this gNB with higher priority, if the gNB is a high DL throughput gNB, then the User Plane Function (UPF) may be configured to dedicate a larger buffer size for this gNB, and so on.

In a 5G network, there are numerous traffic types, and devices served by gNBs. Each traffic type and each device type has different set of service requirements such as DL data speed (DL throughput), UL data speed (UL throughput), DL data transmission latency, UL data transmission latency.

Various embodiments are directed to methods, apparatus, systems and the like wherein 5G core network nodes provide services to gNBs depending on the services that the gNBs are capable of delivering, such as by using a newly defined core network function denoted herein as a RAN Network Repository Function (RNRF).

For each gNB, in response to receiving a supported features/capabilities list from the gNB, the RNRF stores the received features/capability information of the gNB using a unique gNB identifier and an IP address of the gNB. The RNRF matches gNB IP address with gNB identifier.

Thereafter, for a gNB connecting to any core network node or function (e.g., an Access and Mobility Function (AMF)), the core network node or function queries the RNRF using the connecting gNB identifier or IP address to learn the features/capability information of the connecting gNB. This process is repeated for each core network node or function such that a gNB connecting thereto causes the core network node or function to access the RNRF to learn the feature/capability information of the connecting gNB.

In response to learning the feature/capability information of a connecting gNB, the core network node or function may configure its operation accordingly.

Feature/capability information of a connecting gNB may be used for expediting requests based on gNB latency (e.g., for low latency gNBs each core network node handles gNB requests with higher priority than for high latency gNBs).

Feature/capability information of a connecting gNB may be used for shaping/grooming gNB traffic (e.g., for high DL throughput gNBs, a User Plane Function (UPF) dedicates higher buffer sizes than for low DL throughput gNBs), and for other purposes. In this example, each gNB receives the address of the RNRF and transmits features/capability information to the RNRF, after which the AMF retrieves this capability information when a gNB connects and adapts network operations for that gNB depending upon the type of gNB (disclosed types comprise low latency gNB and high downlink throughput gNB.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method, comprising:
at a radio access network (RAN) Network Repository Function (RNRF) in a network core having an IP address known to gNB being provisioned at one or more RAN associated with the network core, receiving capability information from each gNB being provisioned, associating received gNB capability information with a respective gNB identifier, and storing the received gNB capability information and associated identifier in a database;
at the RNRF, in response to receiving from a network function (NF) a request for capability information of an identified gNB, using the gNB identifier to retrieve the requested gNB capability information from the database and forward the retrieved gNB capability information to the requesting NF, the gNB capability information being configured to enable the NF to adapt a network function.

2. The method of claim 1, wherein the requested gNB capability information comprises a number of gNB antennae.

3. The method of claim 2, wherein the requested gNB capability information further comprises a maximum supported user capacity.

4. The method of claim 2, wherein the requested gNB capability information comprises a gNB deployment type.

5. The method of claim 4, wherein the gNB deployment type comprises one of a strand-based deployment, an attachment-based deployment, an indoor or small business deployment, and a fixed wireless access deployment.

6. The method of claim 5, wherein the requested gNB capability information further comprises a backhaul type.

7. The method of claim 1, wherein the requested gNB capability information comprises at least one of gNB hardware capability information and gNB software capability information.

8. The method of claim 1, wherein for a requesting NF servicing a respective NF request associated with the identified gNB, the gNB capability information provided by the NF is configured to adapt the servicing of the NF request associated with the identified gNB.

9. The method of claim 8, wherein the servicing of the NF request associated with the identified gNB is adapted to improve at least one of network efficiency, user experience, SLA compliance, gNB performance, and subscriber or service provider priorities.

10. The method of claim 8, wherein for a requesting NF servicing a respective NF request associated with the identified gNB, the gNB capability information provided by the NF is configured to be shared by the requesting NF with other NFs used by the requesting NF to service the NF request associated with the identified gNB.

11. The method of claim 8, wherein the servicing of the NF request associated with the identified gNB is adapted by modifying a default allocation of bandwidth amount, buffer size, or priority level associated with the gNB.

12. The method of claim 1, wherein gNB capability information indicative of gNB latency is configured to enable the requesting NF to expedite requests from low latency gNB.

13. The method of claim 1, wherein gNB capability information indicative of gNB downlink (DL) throughput is configured to enable the requesting NF to increase DL buffer size for high DL throughput gNB.

14. The method of claim 1, wherein gNB capability information indicative of gNB uplink (UL) throughput is configured to enable the requesting NF to increase UL buffer size for high DL throughput gNB.

15. The method of claim 1, wherein gNB capability information indicative of gNB user equipment (UE) service capability is configured to enable the requesting NF to increase storage resources for gNB capable of serving large numbers of UE.

16. Network equipment used to implement network functions at a network core, the network equipment comprising processing resources and non-transitory memory resources, the processing resources configured to execute software instructions stored in the non-transitory memory resources to provide thereby a core network function, comprising:
a radio access network (RAN) Network Repository Function (RNRF) having an IP address known to gNB being provisioned at one or more RAN associated with the network core;
the RNRF receiving capability information from each gNB being provisioned, associating received gNB capability information with a respective gNB identifier, and storing the received gNB capability information and associated identifier in a database;
the RNRF, in response to receiving from a network function (NF) a request for capability information of an identified gNB, using the gNB identifier to retrieve the requested gNB capability information from the database and forward the retrieved gNB capability information to the requesting NF, the gNB capability information being configured to enable the NF to adapt a network function.

17. The network equipment of claim 16, wherein the requested gNB capability information comprises at least one of a number of gNB antennae, a maximum supported user capacity, a gNB deployment type, and a backhaul type.

18. The network equipment of claim 17, wherein the gNB deployment type comprises one of a strand-based deployment, an attachment-based deployment, an indoor or small business deployment, and a fixed wireless access deployment.

19. The network equipment of claim 16, wherein the requested gNB capability information comprises at least one of gNB hardware capability information and gNB software capability information.

20. The network equipment of claim 16, wherein for a requesting NF servicing a respective NF request associated with the identified gNB, the gNB capability information provided by the NF is configured to adapt the servicing of the NF request associated with the identified gNB.

21. The network equipment of claim 20, wherein the servicing of the NF request associated with the identified gNB is adapted to improve at least one of network efficiency, user experience, SLA compliance, gNB performance, and subscriber or service provider priorities.

22. The network equipment of claim 20, wherein for a requesting NF servicing a respective NF request associated with the identified gNB, the gNB capability information provided by the NF is configured to be shared by the requesting NF with other NFs used by the requesting NF to service the NF request associated with the identified gNB.

23. The network equipment of claim 20, wherein the servicing of the NF request associated with the identified gNB is adapted by modifying a default allocation of bandwidth amount, buffer size, or priority level associated with the gNB.

24. The network equipment of claim 16, wherein:
gNB capability information indicative of gNB latency is configured to enable the requesting NF to expedite requests from low latency gNB;
gNB capability information indicative of gNB downlink (DL) throughput is configured to enable the requesting NF to increase DL buffer size for high DL throughput gNB;
gNB capability information indicative of gNB uplink (UL) throughput is configured to enable the requesting NF to increase UL buffer size for high DL throughput gNB.

25. The network equipment of claim 16, wherein gNB capability information indicative of gNB user equipment (UE) service capability is configured to enable the requesting NF to increase storage resources for gNB capable of serving large numbers of UE.

26. A method, comprising:
receiving, at a network function (NF) associated with a core network, a request associated with a gNB;
transmitting, from the NF toward a radio access network (RAN) Network Repository Function (RNRF) associated with the core network, a request for capability information associated with the gNB, the gNB being associated with a gNB identifier configured to enable the RNRF to retrieve from a database gNB capability information stored during gNB provisioning;
responsive to receiving, at the NF, the requested gNB capability information
adapting the NF in accordance with the gNB capability information and servicing the NF request associated with the gNB in accordance with the adapted NF.

27. The method of claim 26, further comprising sharing, by the requesting NF, received gNB capability information with other NFs used by the requesting NF to service the NF request associated with the identified gNB.

28. The method of claim 26, wherein servicing of the NF request associated with the identified gNB is adapted by modifying a default allocation of bandwidth amount, buffer size, or priority level associated with the gNB.

29. The method of claim 26, wherein:
gNB capability information indicative of gNB latency is configured to enable the requesting NF to expedite requests from low latency gNB;
gNB capability information indicative of gNB downlink (DL) throughput is configured to enable the requesting NF to increase DL buffer size for high DL throughput gNB;
gNB capability information indicative of gNB uplink (UL) throughput is configured to enable the requesting NF to increase UL buffer size for high DL throughput gNB.

30. The method of claim 26, wherein gNB capability information indicative of gNB user equipment (UE) service capability is configured to enable the requesting NF to increase storage resources for gNB capable of serving large numbers of UE.

31. Network equipment used to implement network functions at a network core, the network equipment comprising processing resources and non-transitory memory resources, the processing resources configured to execute software instructions stored in the non-transitory memory resources to provide thereby a network function (NF), the network function configured to perform a method, comprising:
receiving, at the NF, a request associated with a gNB;
transmitting, from the NF toward a radio access network (RAN) Network Repository Function (RNRF) associated with the core network, a request for capability information associated with the gNB, the gNB being associated with a gNB identifier configured to enable the RNRF to retrieve from a database gNB capability information stored during gNB provisioning;
responsive to receiving, at the NF, the requested gNB capability information
adapting the core NF in accordance with the gNB capability information and servicing the NF request associated with the gNB in accordance with the adapted core NF.

32. The network equipment of claim 31, wherein the network function (NF) comprises a 5G core network function.

33. The network equipment of claim 31, wherein the network function (NF) comprises at least one of an Authentication Server Function (AUSF), a Unified Data Management (UDM), Access and Mobility Management Function (AMF), a Policy Control Function (PCF), and a Service Management Function (SMF).

* * * * *